US009061756B2

(12) United States Patent
Jang et al.

(10) Patent No.: US 9,061,756 B2
(45) Date of Patent: Jun. 23, 2015

(54) AIRCRAFT PERFORMANCE MONITORING SYSTEM

(71) Applicant: The Boeing Company, Chicago, IL (US)

(72) Inventors: Jung Soon Jang, Bellevue, WA (US); John Lyle Vian, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 158 days.

(21) Appl. No.: 13/868,407

(22) Filed: Apr. 23, 2013

(65) Prior Publication Data

US 2014/0316613 A1    Oct. 23, 2014

(51) Int. Cl.
*G05D 1/00*    (2006.01)
*B64C 19/00*    (2006.01)

(52) U.S. Cl.
CPC .............. *B64C 19/00* (2013.01); *G05D 1/0055* (2013.01)

(58) Field of Classification Search
CPC .......... G06F 8/61; G07C 5/085; G07C 5/008; G07C 5/0816; H04B 7/18502; H40L 2012/4028; H04L 67/04; H04L 67/06; H04L 67/12; H04L 67/34; H04L 12/185; H04L 12/1881; H04L 12/2697; H04L 41/0896; H04L 41/5003; H04L 41/5009; H04L 43/0864; H04L 43/106; H04L 43/50; H04W 84/005; H04W 84/06; B64C 13/04; B64C 13/10; B64C 13/12; B64C 13/46; B64C 13/503; G01C 21/165; G01S 19/15; G01S 19/49; G05B 13/048; G05D 1/0055; G05D 1/0676; G05D 1/101; G08G 5/0013; G08G 5/0052; G09B 9/16; G09B 9/24; H04N 21/2402; H04N 21/2408; H04N 21/44209; H04N 21/6125; H04N 21/6332; H04N 21/6405; H04N 21/654
USPC ........... 701/3, 5, 14, 36, 472; 700/63; 703/21; 455/66; 370/252; 725/116
See application file for complete search history.

(56) References Cited

U.S. PATENT DOCUMENTS

| 5,216,611 | A | * | 6/1993 | McElreath | 701/472 |
|---|---|---|---|---|---|
| 5,260,874 | A | * | 11/1993 | Berner et al. | 701/36 |
| 6,092,008 | A | * | 7/2000 | Bateman | 701/14 |
| 8,106,753 | B2 | | 1/2012 | Vian et al. | |
| 2002/0111720 | A1 | * | 8/2002 | Holst et al. | 701/3 |
| 2003/0003872 | A1 | * | 1/2003 | Brinkley et al. | 455/66 |
| 2004/0044444 | A1 | * | 3/2004 | Johnson et al. | 701/3 |
| 2005/0080495 | A1 | * | 4/2005 | Tessier et al. | 700/63 |
| 2010/0150009 | A1 | * | 6/2010 | Mangs et al. | 370/252 |
| 2010/0333160 | A1 | * | 12/2010 | Flinta et al. | 725/116 |
| 2011/0202207 | A1 | * | 8/2011 | Louise et al. | 701/5 |
| 2011/0245999 | A1 | * | 10/2011 | Kordonowy | 701/3 |
| 2012/0109620 | A1 | * | 5/2012 | Gaikwad et al. | 703/21 |

\* cited by examiner

*Primary Examiner* — James Trammell
*Assistant Examiner* — Sanjeev Malhotra
(74) *Attorney, Agent, or Firm* — Yee & Associates, P.C.

(57) ABSTRACT

A method and apparatus for monitoring an aircraft. A current performance of the aircraft is identified during operation of the aircraft using a model of the aircraft and flight state data. A current capability of the aircraft is identified from the current performance of the aircraft. An operation is performed based on the current capability of the aircraft.

20 Claims, 10 Drawing Sheets

FIG. 11
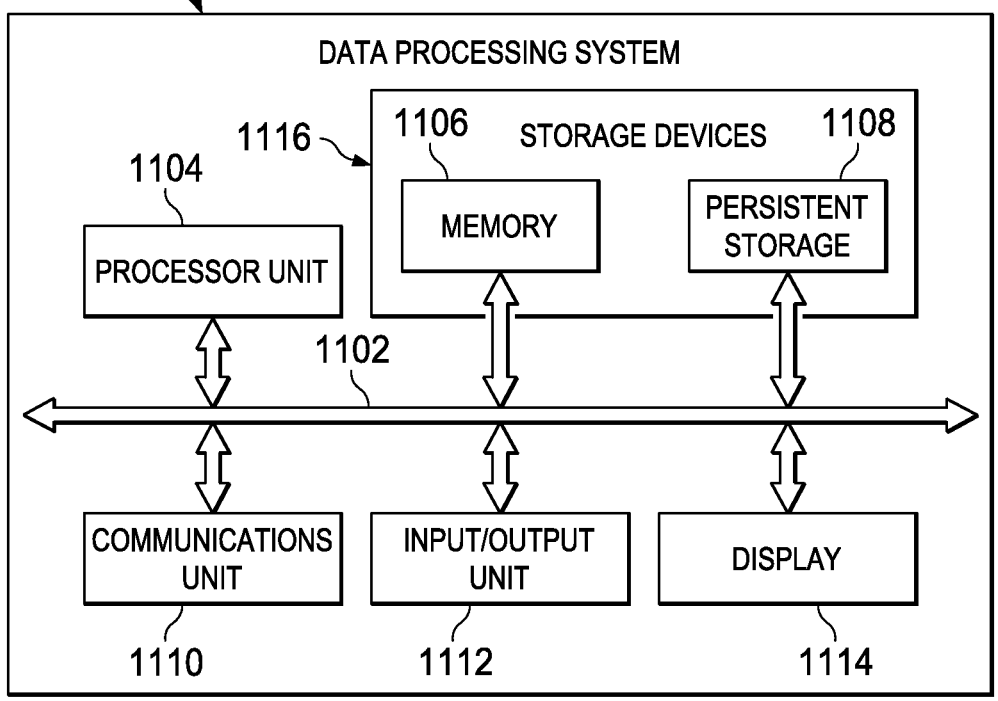
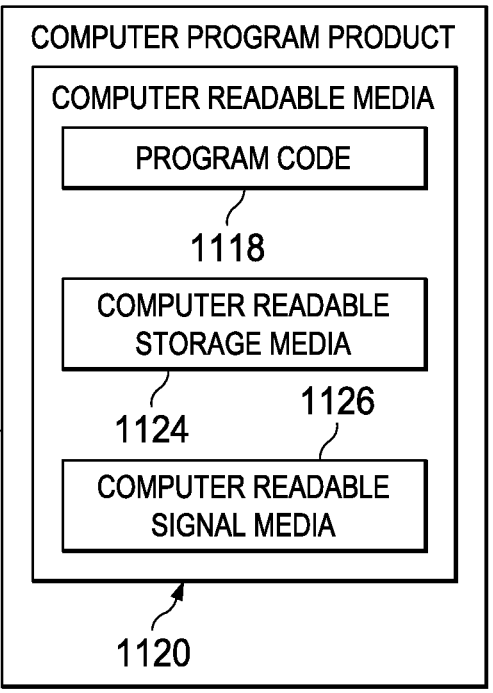

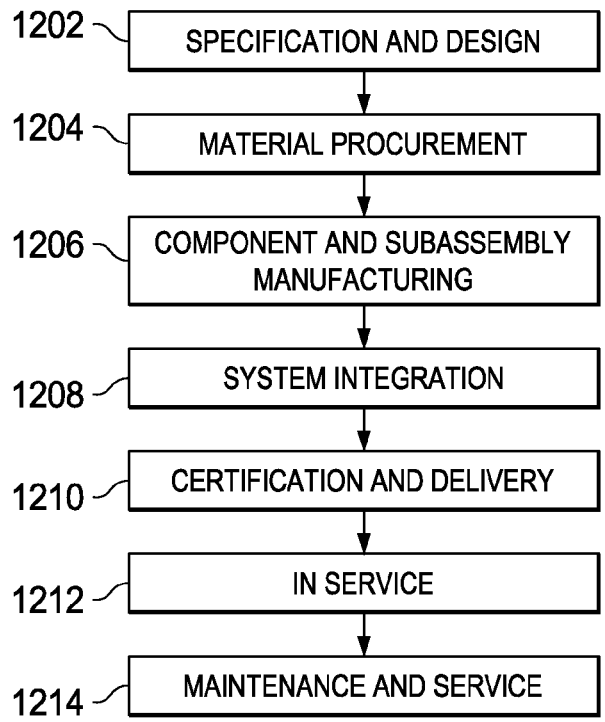
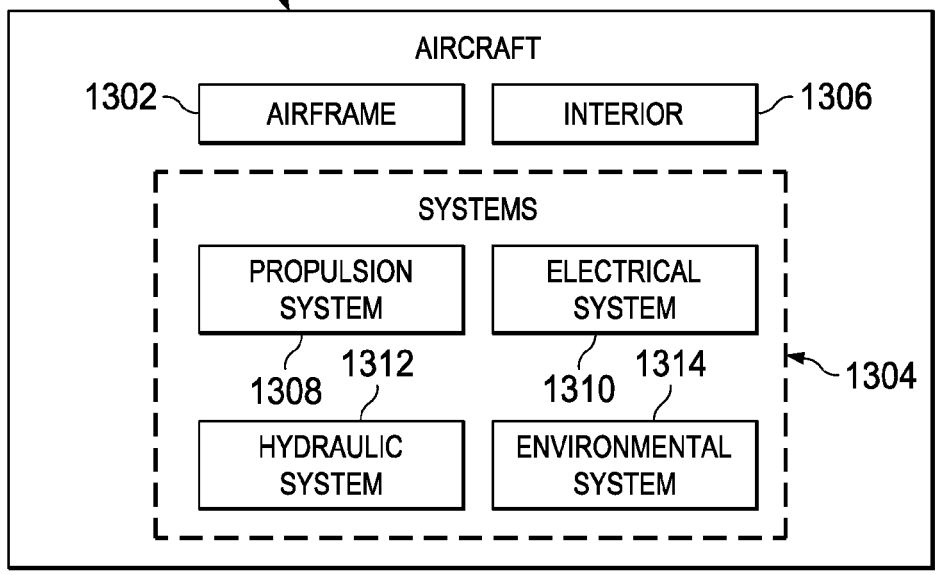

AIRCRAFT PERFORMANCE MONITORING SYSTEM

BACKGROUND INFORMATION

1. Field

The present disclosure relates generally to aircraft, and in particular, to monitoring aircraft performance. Still more particularly, the present disclosure relates to a method and apparatus for monitoring aircraft during operation of the aircraft to determine whether the capability of the aircraft has changed based on sensor data.

2. Background

Aircraft are complex vehicles that contain many different types of systems. For example, an aircraft often includes a computer system. The computer system is one or more computers that may be used to operate and monitor the aircraft. For example, a navigation system may be present to provide navigation information to the pilot as well as aid in flying the aircraft along a route.

As another example, an aircraft may include a health monitoring system. The health monitoring system may be integrated as part of the aircraft. For example, sensors in a sensor system may be present in different locations to monitor various parameters regarding the operation of the aircraft. These parameters may include, for example, engine temperature, cabin temperature, outside temperature, fuel level, airspeed, hydraulic pressure in-lines, and other parameters.

The sensors generate sensor data. The sensor data is sent back to a computer in the computer system that is part of the health monitoring system. The sensor data may be used to provide system diagnostics and prognostics with respect to the health of the aircraft. The sensor data is often used for maintenance and support services. In this manner, the availability and number of flights per aircraft may be increased using this sensor data.

The sensor data may also be used by other systems in the aircraft. For example, cabin temperature may be used to control an environmental system for a passenger cabin.

Therefore, it would be desirable to have a method and apparatus that take into account at least some of the issues discussed above, as well as other possible issues.

SUMMARY

An illustrative embodiment of the present disclosure provides a method for monitoring an aircraft. A current performance of the aircraft is identified during operation of the aircraft using a model of the aircraft and flight state data. A current capability of the aircraft is identified from the current performance of the aircraft. An operation is performed based on the current capability of the aircraft.

Another illustrative embodiment of the present disclosure provides an apparatus comprising a performance monitoring system configured to identify a current performance of an aircraft during operation of the aircraft using a model of the aircraft and flight state data. The performance monitoring system is further configured to identify a current capability of the aircraft from the current performance of the aircraft. The performance monitoring system is still further configured to perform an operation based on the current capability of the aircraft.

Yet another illustrative embodiment of the present disclosure provides an aircraft performance monitoring system comprising a performance monitor, a flight envelope monitor, and a capability identifier. The performance monitor is configured to identify a current performance of an aircraft during operation of the aircraft using a model of the aircraft and flight state data. The flight envelope monitor is configured to identify a flight envelope from the current performance of the aircraft. The capability identifier is configured to identify a current capability of the aircraft from the flight envelope.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a block diagram of a data processing system in accordance with an illustrative embodiment;

FIG. 12 is an illustration of an aircraft manufacturing and service method in the form of a block diagram in accordance with an illustrative embodiment; and FIG. 13 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that the sensor data generated by currently used health monitoring systems may be used for many different purposes. For example, cabin temperature may be used to control an environmental system for a passenger cabin.

The illustrative embodiments recognize and take into account that it would be desirable to perform aircraft performance monitoring. Aircraft performance monitoring involves evaluating and predicting the ability of an aircraft to operate based on the state of the aircraft. The illustrative embodiments recognize and take into account that the sensor data generated by a sensor system, such as those in a health monitoring system, may be used to perform aircraft performance monitoring.

The illustrative embodiments recognize and take into account that this monitoring may be used to identify a current or up-to-date capability of the aircraft. With the current capability of aircraft, the illustrative embodiments recognize and take into account that operation of the aircraft may be managed during flight in a manner that reaches desired performance goals. These performance goals may include safety, passenger comfort, cost, and other goals.

Figure 1:
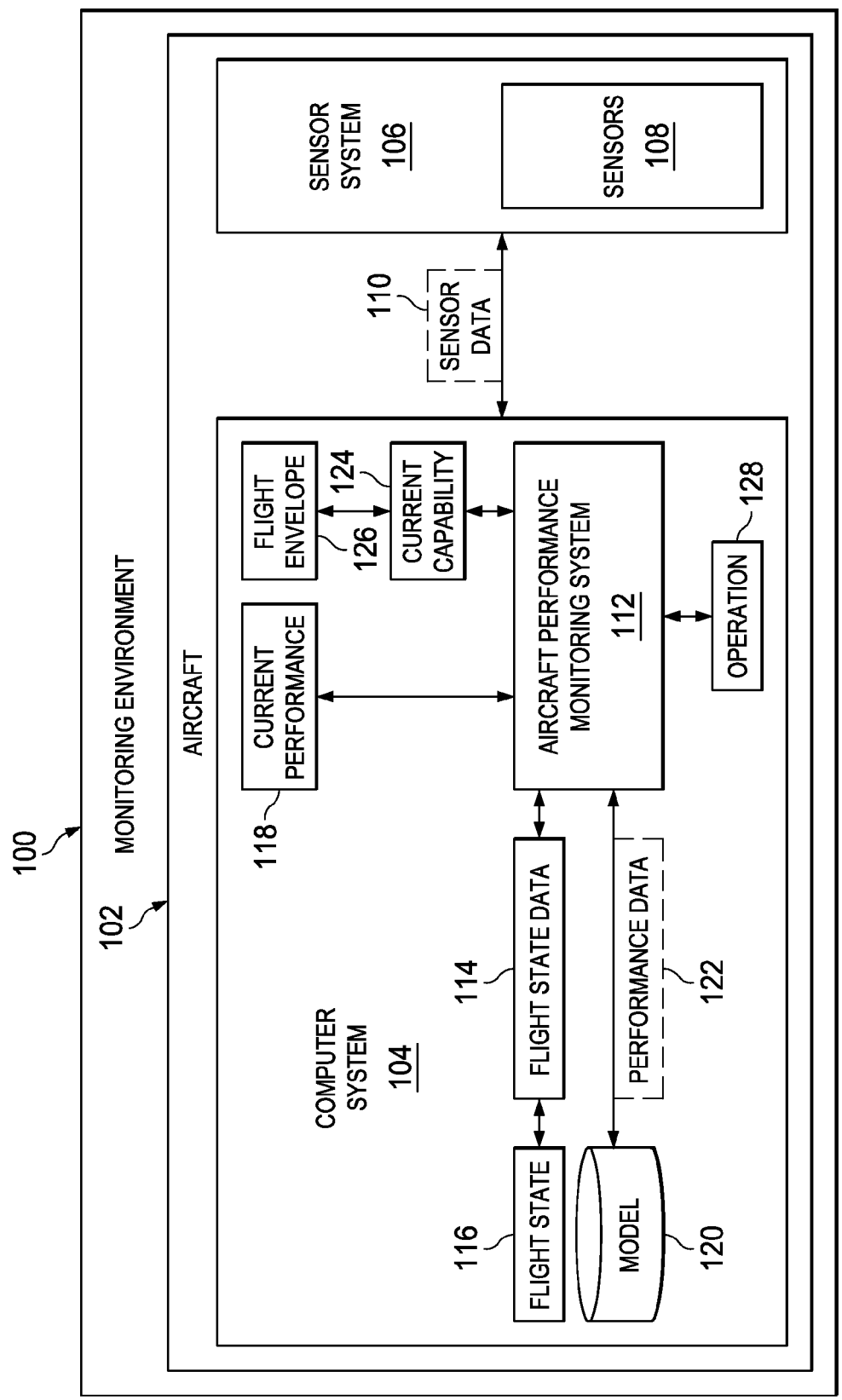
FIG. 1 is an illustration of a monitoring environment in the form of a block diagram in accordance with an illustrative embodiment.

With reference now to FIG. 1, an illustration of a monitoring environment is depicted in the form of a block diagram in accordance with an illustrative embodiment. In this depicted example, monitoring environment 100 includes aircraft 102.

As depicted, aircraft 102 includes computer system 104 and sensor system 106. Computer system 104 includes one or more computers. When more than one computer is present, those computers may communicate with each other through a communications medium such as a network.

In this illustrative example, sensor system 106 comprises sensors 108. Sensors 108 may be distributed throughout aircraft 102. In particular, sensors 108 generate sensor data 110. Sensors 108 may generate sensor data 110 from the state of aircraft 102, the environment around aircraft 102, the state of structures in aircraft 102, the operation of devices in aircraft 102, and other suitable types of information. The state of aircraft 102 may include, for example, the location of the aircraft, a direction of travel, speed, acceleration, altitude, attitude, and other suitable types of information. A set of structures may include a position of a flap, how far the flap can move, a rudder position, the extent to which the rudder can move, whether an inconsistency is present in a structure, and other suitable types of information. Sensor data 110 about the operation of devices may include commands generated by pilot controls, an autopilot, an environmental control system, and other suitable devices in aircraft 102.

Different events may affect the state of aircraft 102. These events may include, for example, weather, performing collision avoidance, cargo hold inconsistencies, inconsistencies in skin panels, windows, undesired levels of fluids, valves performing in an undesired manner, an electromagnetic event, an unintended encounter with birds, hail, and other events.

Aircraft performance monitoring system 112 is configured to use sensor data 110. Sensor data 110 may be selected, processed, or both selected and processed by aircraft performance monitoring system 112 to identify flight state data 114 that describes flight state 116 for aircraft 102 during operation of aircraft 102. Flight state 116 may be the motion of aircraft 102.

In this illustrative example, flight state data 114 may be selected from some or all of sensor data 110. The portions of sensor data 110 selected may be processed to form flight state data 114. As a result, not all of sensor data 110 may be used in different illustrative examples to identify flight state data 114. Flight state data 114 may be, for example, at least one of climb rate, descent rate, turning rate, airspeed, flight path angle, altitude, attitude, and other suitable types of data.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In the illustrative examples, flight state data 114 also may include sensor data 110 in the form of commands generated by a pilot. These commands may be detected by sensors associated with controls operated by a pilot. In yet other illustrative examples, flight state data 114 may include sensor data 110 in the form of commands generated by a device such as an autopilot.

As depicted, aircraft performance monitoring system 112 is configured to identify current performance 118 for aircraft 102. In particular, aircraft performance monitoring system 112 may identify current performance 118 using flight state data 114 and model 120 of aircraft 102.

Aircraft performance monitoring system 112 may be implemented in software, hardware, firmware or a combination of thereof. When software is used, the operations performed by aircraft performance monitoring system 112 may be implemented in program code configured to run on a processor unit. When firmware is used, the operations performed by aircraft performance monitoring system 112 may be implemented in program code and data and stored in persistent memory to run on a processor unit. When hardware is employed, the hardware may include circuits that operate to perform the operations in aircraft performance monitoring system 112.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, model 120 is a model of aircraft 102. Model 120 is configured to receive input such as flight state data 114 and generate output such as performance data 122. Performance data 122 describes current performance 118 of aircraft 102.

With current performance 118, aircraft performance monitoring system 112 is configured to identify current capability 124 for aircraft 102. Current capability 124 may be described in a number of different ways. For example, current capability 124 may be described using flight envelope 126. For example, current capability 124 may be described at least in part using flight envelope 126. In the illustrative examples, flight envelope 126 may describe acceleration that can be achieved by aircraft 102. This acceleration may be, for example, linear acceleration, angular acceleration, or a combination of the two.

As flight state 116 for aircraft 102 changes, current performance 118 also changes. The change in current performance 118 may also result in a change in current capability 124. These changes may be caused by a number of different types of sources. For example, the changes in flight state 116 may be affected by an occurrence of inconsistencies in aircraft 102, a reconfiguration of aircraft 102, or from other sources. These changes may increase current capability 124, decrease current capability 124, or both increase and decrease current capability 124 of aircraft 102. For example, the range of aircraft 102 may be increased while a turning ability may be decreased in current capability 124 of aircraft 102.

In the illustrative example, aircraft performance monitoring system 112 may also perform operation 128 based on current capability 124 of aircraft 102. Operation 128 may take various forms. For example, operation 128 may include indicating a change in current capability 124 for aircraft 102. In another illustrative example, operation 128 may include performing at least one of displaying a current flight envelope for the aircraft, changing a route of the aircraft, suggesting a change to the route of the aircraft, and other suitable actions.

In this manner, monitoring of current performance 118 for aircraft 102 may be used to identify current capability 124 of aircraft 102 during operation of aircraft 102. The operation of aircraft 102 may include, for example, aircraft 102 sitting at a gate, moving on a taxiway, taking off, in level flight, or other operations.

Further, by identifying current capability 124 for aircraft 102, changes in the operation of aircraft 102 may be made for increasing safety, reducing fuel use, reducing trip time, increasing passenger comfort, and other suitable goals.

Further, aircraft performance monitoring system 112 may be used with currently installed sensor systems. For example, sensor system 106 may be part of a health monitoring system already installed in aircraft 102. As a result, all of sensor data 110 may not be needed by aircraft performance monitoring system 112 to identify current performance 118 and current capability 124. In particular, sensor data 110 may be selected, processed, or both selected and processed to generate flight state data 114 that is used with model 120.

Figure 2:
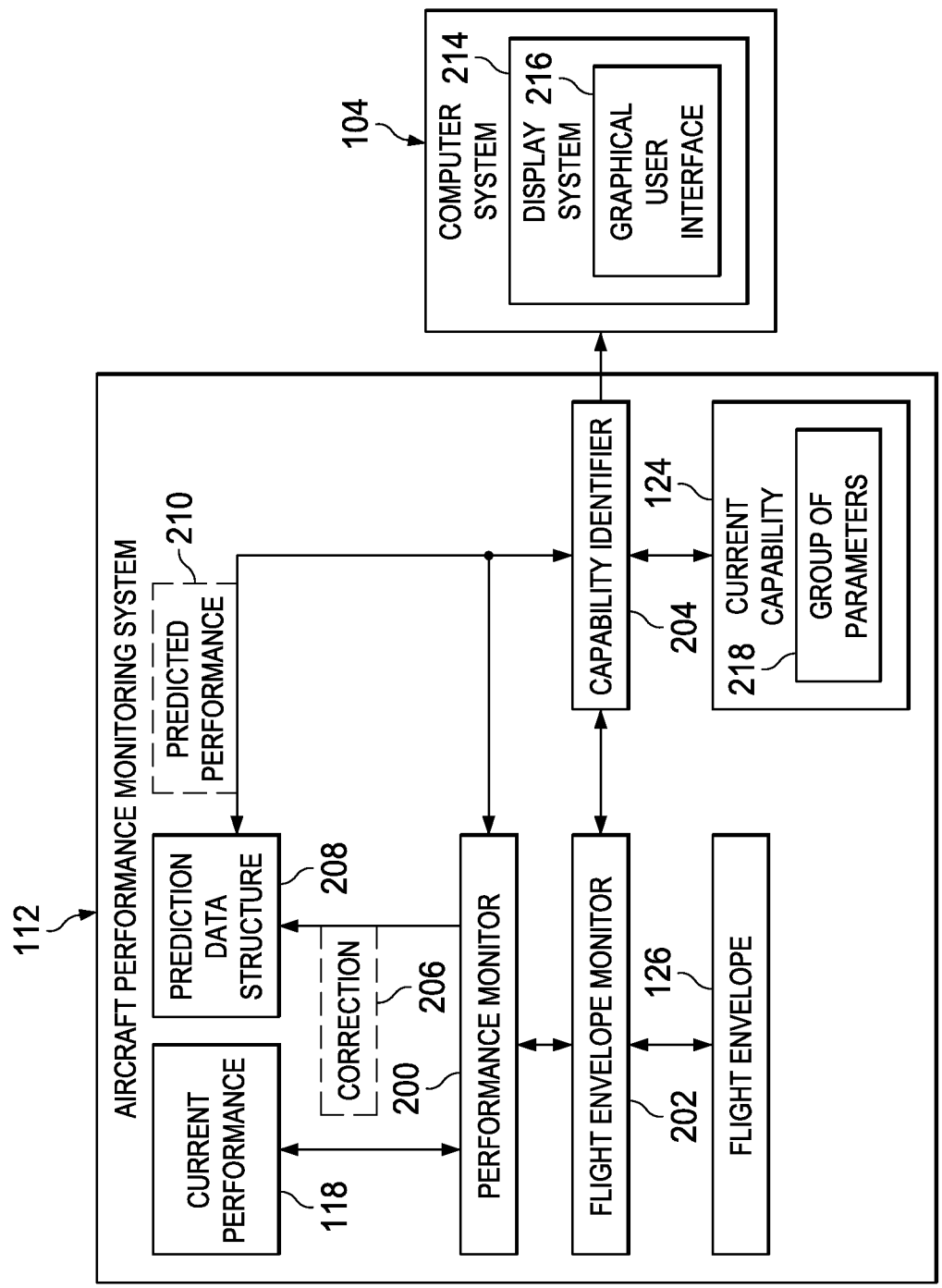
FIG. 2 is an illustration of an aircraft performance monitoring system in the form of a block diagram in accordance with an illustrative embodiment.

Turning next to FIG. 2, an illustration of an aircraft performance monitoring system is depicted in the form of a block diagram in accordance with an illustrative embodiment. An illustration of components and data flow between components that may be used in aircraft performance monitoring system 112 is shown.

Aircraft performance monitoring system 112 may have a number of different components. In this illustrative example, aircraft performance monitoring system 112 includes performance monitor 200, flight envelope monitor 202, and capability identifier 204.

Performance monitor 200 is configured to identify current performance 118 using flight state data 114 and model 120. In this illustrative example, current performance 118 is described using thrust, lift, and drag. Of course, other parameters may be used in addition to or in place of these in other illustrative examples. In addition to identifying current performance 118, performance monitor 200 also may identify correction 206 using flight state data 114 and model 120.

In particular, performance monitor 200 may identify a difference between current performance 118 and predicted performance 210. This difference may form correction 206 which may be used to update prediction data structure 208.

Prediction data structure 208 is configured to generate predicted performance 210. Predicted performance 210 may be used by other systems in the aircraft in the illustrative examples. These other systems may include, for example, a navigation system, an autopilot system, and other suitable systems in the aircraft.

The update performed by performance monitor 200 is an example of one manner in which operation 128 in FIG. 1 may be implemented. Prediction data structure 208 may be, for example, a table, a database, a linked list, a flat file, an aerodynamic and engine table, an aerodynamic and engine database, or some other suitable type of data structure.

In particular, prediction data structure 208 may be, for example, an aerodynamic and engine database or an aerodynamic and engine table. This database or table may be used by other components in aircraft 102. Updates may be made to aerodynamic and engine database or the aerodynamic and engine table.

In some illustrative examples, prediction data structure 208 may be an aerodynamic and engine table that is a copy made from the aerodynamic and engine database. In the illustrative examples, the aerodynamic and engine table may be a copy of a portion of the aerodynamic and engine database. The copy may be made for use in performing updates to aerodynamic and engine table during flight. Updates to aerodynamic and engine database may be made after the flight has occurred. This type of updating may decrease the time and complexity of certifications for use in aircraft 102.

As depicted, flight envelope monitor 202 uses current performance 118 to identify flight envelope 126, which describes limits to the maneuverability of aircraft 102. These limits may be, for example, limits to yaw acceleration, roll acceleration, and other suitable limits. In another illustrative example, limits on the minimum airspeed at which controlled flight can be maintained may be present. Further, in some illustrative examples, flight envelope monitor 202 may take into account desired states of aircraft 102. For example, a desired state is a description of the movement of aircraft 102 that is desired for aircraft 102. This description may include a number of different parameters describing operation of aircraft 102. For example, a desired state may include at least one of a minimum altitude, a maximum altitude, a speed, and other suitable parameters. The desired state may be present for particular portions of a route and may change over the route of an aircraft.

Commands generated by a pilot in aircraft 102 may be used by flight envelope monitor 202. These commands may be compared to a control authority for control surfaces on the aircraft. For example, the control authority may define a smaller amount of movement than is actually physically possible with the control surface. The control authority may be based on regulations regarding passenger comfort, safety, and other suitable types of regulations.

In the illustrative example, capability identifier 204 is configured to identify current capability 124 for aircraft 102. In these illustrative examples, this identification may be performed using flight envelope 212 from flight envelope monitor 202. Additionally, the identification of current capability 124 also may be performed using predicted performance 210.

As depicted, current capability 124 may be presented to an operator on display system 214 in computer system 104. In particular, current capability 124 may be displayed on graphical user interface 216 on display system 214 as limits to group of parameters 218 for operating aircraft 102. For example, limits to a group of parameters may be displayed, which may include at least one of limits to controls, performance, and other parameters in group of parameters 218.

Figure 3:
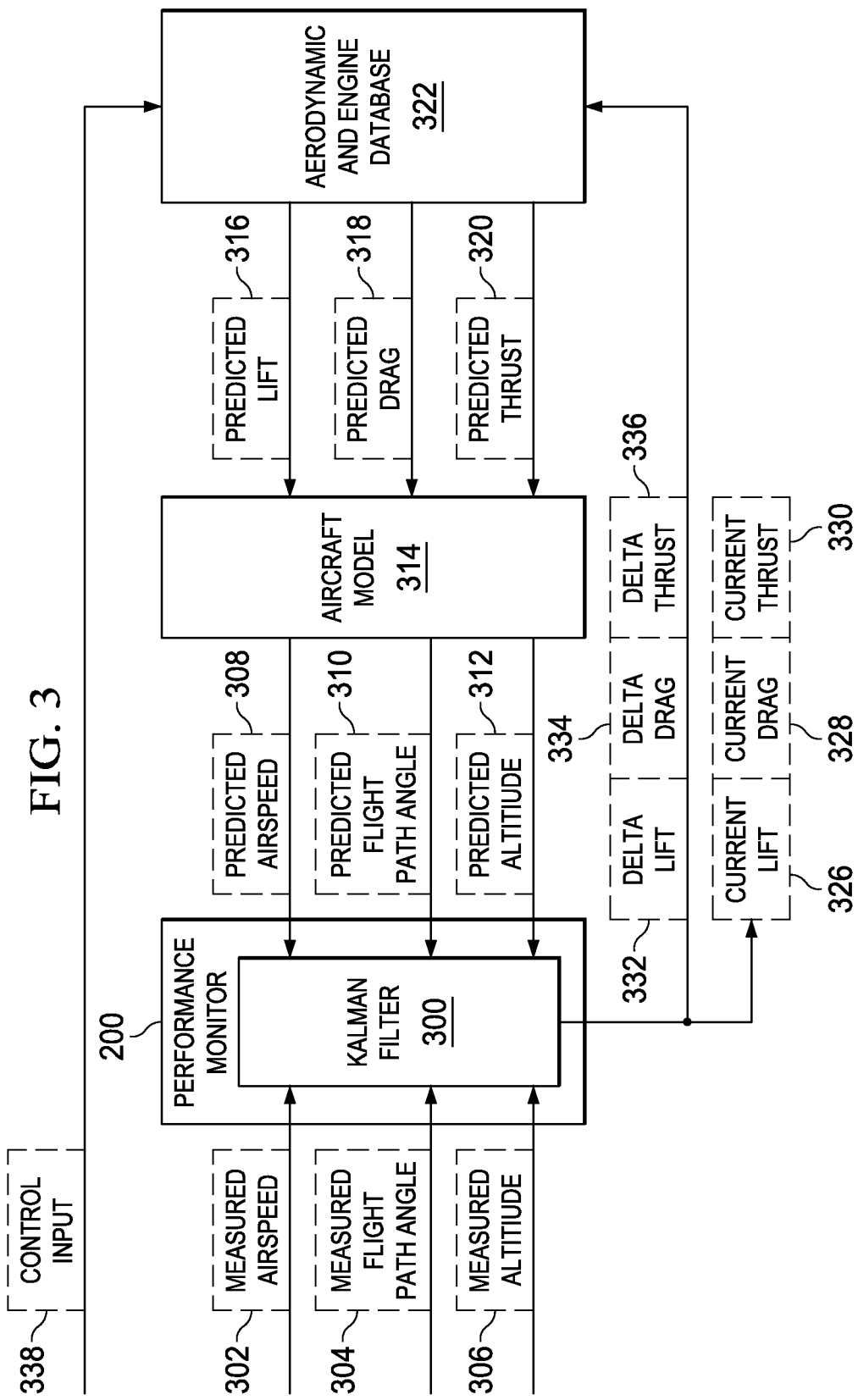
FIG. 3 is an illustration of data flow for identifying the performance of an aircraft in accordance with an illustrative embodiment.

Turning now to FIG. 3, an illustration of data flow for identifying the performance of an aircraft is depicted in accordance with an illustrative embodiment. In this illustrative example, performance monitor 200 performs a comparison of measured state data to state data. In this illustrative example, the state data is computed via aircraft model 314 using corrected performance data obtained from a design of aerodynamic and engine database and corrections. In other words, performance monitor 200 is configured to use sensor data 110 and select parameters from sensor data 110 or calculate parameters from sensor data 110 needed to identify current capability 124 for aircraft 102. The selection of parameters, calculation of parameters, or both is made to compute the performance and capability of parameters of interest. The additional examples of parameters that may be of interest include climb rate, descent rate, service ceiling, turn rate, maximum speed, minimum speed, speed, flight time, and other suitable parameters.

In this illustrative example, the comparison is performed by Kalman filter 300 in performance monitor 200. Kalman filter 300 may be implemented using software, hardware, or some combination thereof. Kalman filter 300 is configured to perform model-based data generation in this illustrative example. Of course, other types of techniques such as state observers and inverse models may be used in other illustrative examples. In still other illustrative examples, fuzzy inference, neural networks, and other techniques may be used.

In this illustrative example, Kalman filter 300 uses measured airspeed 302, measured flight path angle 304, and measured altitude 306 in sensor data 110 as inputs. This data in sensor data 110 is considered flight state data 114. Of course, other types of sensor data 110, in addition to or in place of these examples, may be used depending on the particular implementation. In some instances, sensor data 110 may include data that is not flight state data 114. For example, sensor data 110 may include data about an engine such as revolutions per minute, fuel burn rate, temperature, and other parameters. These parameters in sensor data 110 may be processed to generate parameters for flight state data 114. For example, these parameters may be processed to generate data about engine thrust, engine health, and other parameters affecting the performance of aircraft 102.

Kalman filter 300 also receives predicted airspeed 308, predicted flight path angle 310, and predicted altitude 312 from aircraft model 314. Aircraft model 314 is an example of model 120 in FIG. 1. As depicted, aircraft model 314 is configured to generate predicted airspeed 308, predicted flight path angle 310, and predicted altitude 312. These parameters are generated by aircraft model 314 using predicted lift 316, predicted drag 318, and predicted thrust 320 generated by aerodynamic and engine database 322 in this illustrative example.

With these inputs, Kalman filter 300 generates current lift 326, current drag 328, and current thrust 330 as outputs. As depicted, a comparison of the measured flight state data in the predicted flight state data may be used by Kalman filter 300 to identify current lift 326, current drag 328, and current thrust 330. In this illustrative example, current lift 326, current drag 328, and current thrust 330 are examples of parameters for current performance 118 in FIG. 1. These parameters are examples of parameters generated using data fusion performed by Kalman filter 300.

Additionally, Kalman filter 300 also generates delta lift 332, delta drag 334, and delta thrust 336 in this illustrative example. These parameters are examples of correction 206 in FIG. 2. These parameters may be used to update aerodynamic and engine database 322.

In these illustrative examples, predicted lift 316, predicted drag 318, and predicted thrust 320 are generated by aerodynamic and engine database 322 using corrections, such as delta lift 332, delta drag 334, and delta thrust 336 in response to receiving control input 338. Control input 338 may be received from various sources such as input generated by a pilot operating controls in the aircraft, an autopilot, or other sources. Control input 338 may be commands that control the engine, an elevator, an aileron, a rudder, or other air control surfaces or other devices that may affect the performance of aircraft 102.

In the illustrative example, predicted lift 316, predicted drag 318, and predicted thrust 320 are predicted parameters because aerodynamic and engine database 322 assumes that aircraft 102 does not change from its baseline design. In this illustrative example, a baseline design is a design of an aircraft based on its specifications without changes such as those that occur from wear and tear and aging of aircraft 102 or other inconsistencies that may occur. In other words, aerodynamic and engine database 322 does not take into account changes in aircraft 102, such as the development of inconsistencies, changes in configurations, or other changes that may occur in aircraft 102 during flight of aircraft 102 or from the last design update of aerodynamic and engine database 322. In this illustrative example, the design update to aerodynamic and engine database 322 may be updated periodically to take into account aging or use of aircraft 102 as well as other changes that may change the performance of aircraft 102. These changes, however, may require certification or review in some cases.

Aircraft model 314 uses predicted lift 316, predicted drag 318, and predicted thrust 320 to generate a prediction of the following parameters: predicted airspeed 308, predicted flight path angle 310, and predicted altitude 312 for the flight state.

The illustration of monitoring environment 100 and the different components in the environment in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In yet other illustrative examples, flight envelope 126 may be displayed in graphical user interface 216 as current capability 124. This display of flight envelope 126 may be used in place of or in addition to other parameters in group of parameters 218.

For example, in FIG. 3, aircraft model 314 is shown as a component located outside of aircraft performance monitoring system 112. In other illustrative examples, aircraft model 314 may be considered part of aircraft performance monitoring system 112 rather than an external component, as depicted in this illustrative example.

As another illustrative example, other types of parameters may be used to describe performance in addition to or in place of thrust, lift, and drag. For example, other types of parameters may include control derivative parameters, such as pitching moment coefficient as a function of change of elevator angle, and other suitable parameters may be used with respect to describing the current performance of the aircraft.

Figure 4:
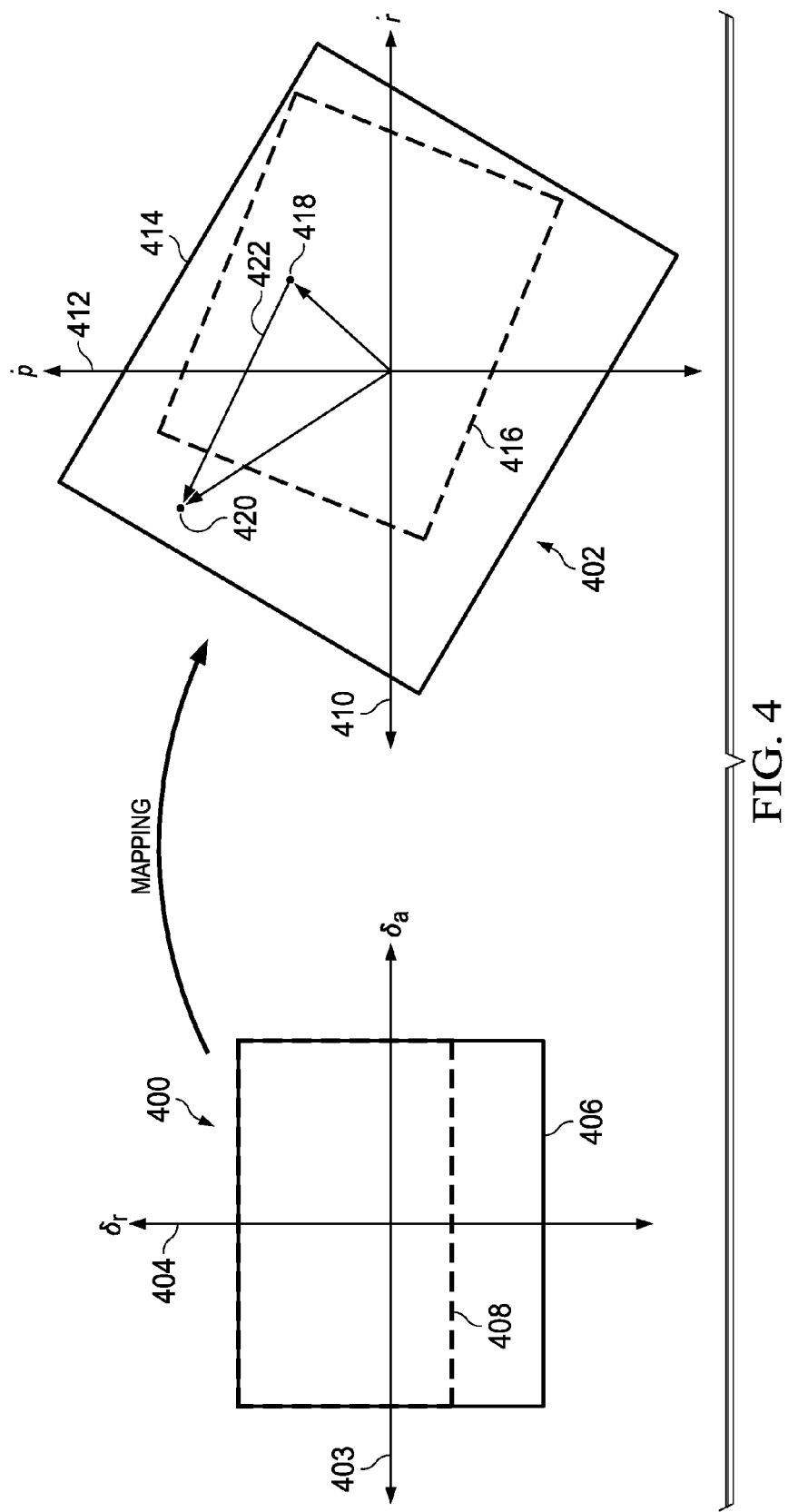
FIG. 4 is an illustration of identifying a flight envelope in accordance with an illustrative embodiment.

Turning now to FIG. 4, an illustration of identifying a flight envelope is depicted in accordance with an illustrative embodiment. In this illustrative example, graph 400 illustrates performance of aircraft 102. Graph 402 illustrates flight envelopes for an aircraft. The performance of aircraft 102 in graph 400 may be mapped to the flight envelopes in graph 402.

In the illustrative examples, the mapping may be performed using any function that may convert information about the performance of the aircraft into a flight envelope for the aircraft. The mapping may be performed using any function that converts parameters from the performance of aircraft into parameters for a flight envelope.

In graph 400, X-axis 403 represents aileron deflection for aircraft 102. As depicted, Y-axis 404 in graph 400 represents rudder deflection for aircraft 102.

Rectangle 406 represents the original performance of aircraft 102 with respect to aileron deflection and rudder deflection. This original performance is the performance of the aircraft prior to any change such as an inconsistency, reconfiguration, or some other change that affects the performance of aircraft 102. Rectangle 408 represents the current performance of aircraft 102 with respect to aileron deflection and rudder deflection. Rectangle 408 is an example of a visualization of current performance 118 of aircraft 102 in FIG. 1.

As seen in this illustrative example, a change in aircraft 102 results in reduced rudder deflection for aircraft 102. This change may be caused by an inconsistency, reconfiguration, or some other change in the aircraft.

As depicted in this illustrative example, X-axis 410 in graph 402 represents yaw acceleration for aircraft 102. Y-axis 412 represents roll acceleration for aircraft 102.

In this illustrative example, rectangle 414 represents the original flight envelope. Rectangle 416 represents the current flight envelope. This current flight envelope is an example of flight envelope 126 in FIG. 2.

As can be seen, rectangle 416 shows a reduction in the flight envelope for the aircraft as compared to rectangle 414. In this illustrative example, the current state represents the current motion of the aircraft. For example, point 418 may be the origin, meaning that the aircraft flies straight and is turning. Point 420 may represent the desired state for the aircraft. For example, 30 degrees banking, which causes the aircraft to turn, may be represented by the state at point 420. Line 422 represents a control difference needed to reach the state in point 420 from the current state in point 418. Operator inputs, such as manipulation of a flight stick, may be used to change control surfaces such as an aileron and rudder to perform the turn.

As depicted in this particular example, point 420 is located outside of the envelope as defined by rectangle 416. As a result, point 420 may not be attainable based on the current state of the aircraft. As a result, attempts to change from point 418 to point 420 for aircraft 102 may result in undesired operation of aircraft 102. In other words, the aircraft may not be able to bank at 30 degrees to turn. Instead, the bank angle may be less than 30 degrees to stay within the flight envelope defined by rectangle 416.

In this illustrative example, at least one of graph 400 and graph 402 may be displayed in graphical user interface 216 on display system 214 in FIG. 2. In this manner, information about the current capability of the aircraft may be presented to an operator such as a pilot.

The illustrations of graph 400 and graph 402 are provided as examples of one manner in which performance and flight envelopes may be implemented. For example, although the current performance of aircraft 102 is shown with respect to aileron deflection and rudder deflection, other parameters may be described in a similar fashion. For example, the performance may be engine thrust, flap deflection, and other suitable types of performance that may be of interest. As yet another example, although the flight envelopes illustrated in graph 402 describe yaw acceleration and roll acceleration, other types of parameters may be described using flight envelopes. Other types of flight envelopes may include different parameters such as climb rate versus altitude, turning rate versus bank angle, the versus range, and other suitable combinations of parameters.

Figure 5:
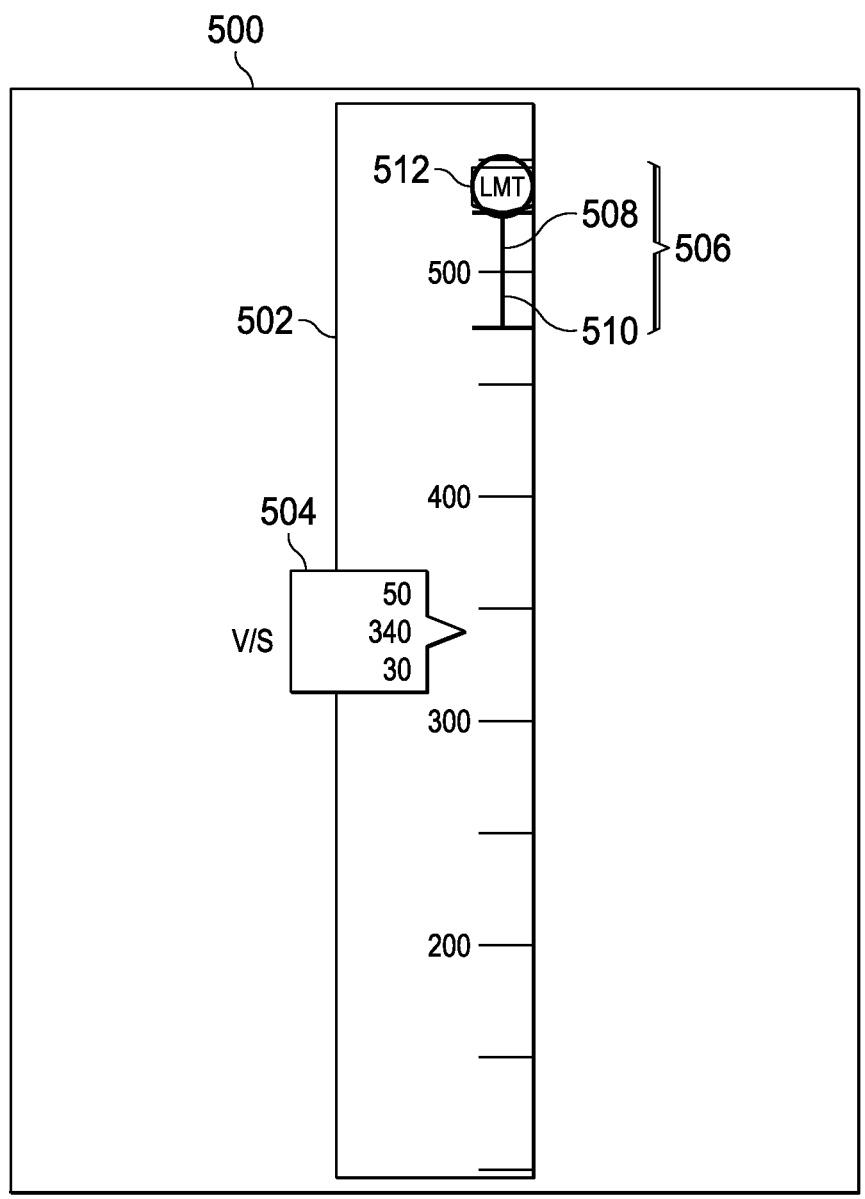
FIG. 5 is an illustration of a graphical user interface displaying a current capability of an aircraft in accordance with an illustrative embodiment.

Turning now to FIG. 5, an illustration of a graphical user interface displaying a current capability of an aircraft is depicted in accordance with an illustrative embodiment. In this depicted example, graphical user interface 500 is an example of one implementation for graphical user interface 216 shown in block form in FIG. 2.

As depicted, graphical user interface 500 illustrates the climb rate of the aircraft. As can be seen in this example, bar 502 illustrates the climb rate in feet per minute. Graphical indicator 504 is an indicator that identifies the current climb rate of the aircraft.

In this illustrative example, the current capability of the aircraft may be indicated in section 506 of bar 502. Section 506 includes graphical indicator 508. Graphical indicator 508 identifies a limit to the climb rate. In other words, graphical indicator 508 identifies a limit to the current capability of the aircraft. This limit may be absent when inconsistency in the aircraft, changing configuration the aircraft, or some other condition is not present.

As depicted, graphical indicator 508 is comprised of line 510 and circle 512. Line 510 identifies a warning area with respect to the limit. Circle 512 identifies the limit to the climb rate in this particular example.

Figure 6:
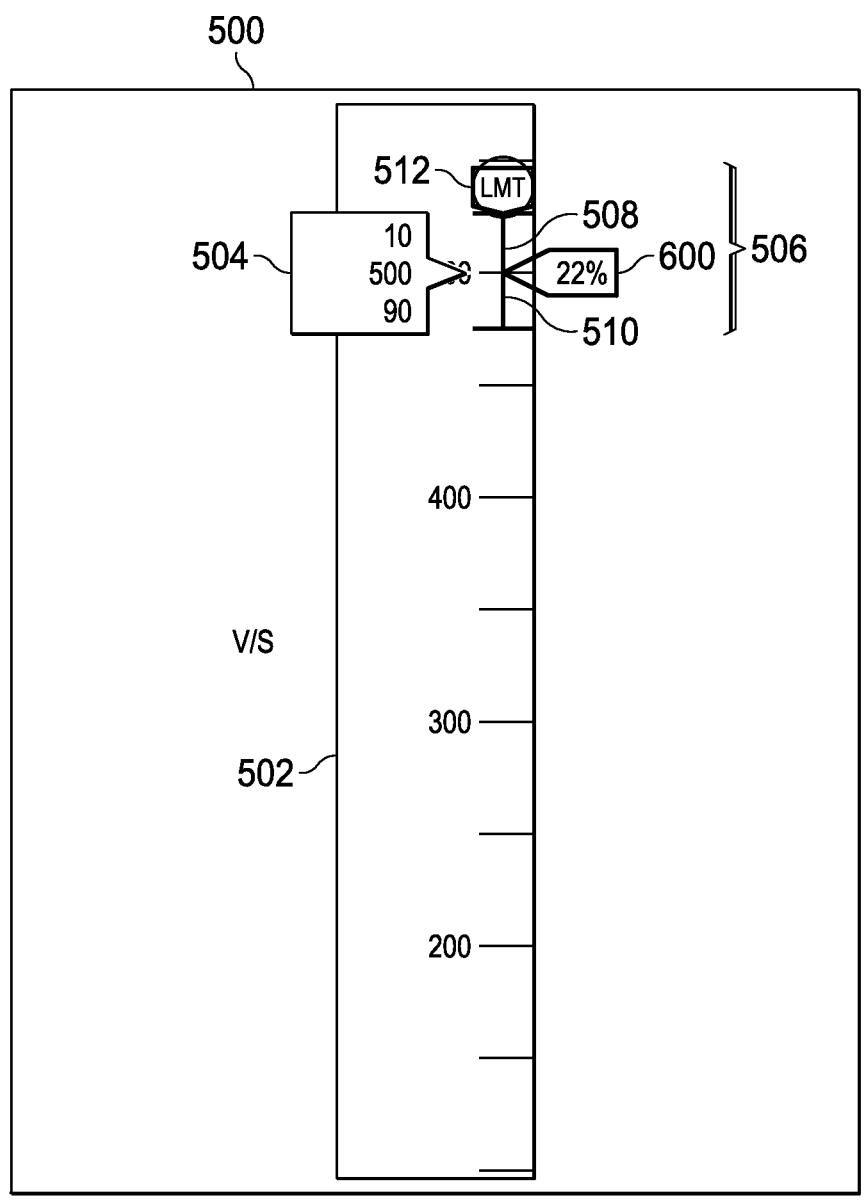
FIG. 6 is another illustration of a graphical user interface displaying a current capability of an aircraft in accordance with an illustrative embodiment.

Turning to FIG. 6, another illustration of a graphical user interface displaying a current capability of an aircraft is depicted in accordance with an illustrative embodiment. In this example, graphical indicator 504 is shown as approaching the limits identified by graphical indicator 508. In this illustrative example, graphical indicator 600 is displayed. Graphical indicator 600 provides an indication that the climb rate is within 22 percent of the limit in this example. As graphical indicator 504 moves closer to the limit indicated by graphical indicator 508, the percentage displayed by graphical indicator 600 increases to indicate that the climb rate is moving closer to the limit for the aircraft.

In this manner, information about the current capability of the aircraft may be displayed to an operator. This display may be used in addition to or in place of the graphs illustrated in FIG. 4. In this particular example, the display of the current capability of aircraft may be used in conjunction with the display of other information already displayed to the pilot. In other words, the change in the current capability may supplement what the pilot expects to see in operating the aircraft.

Figure 7:
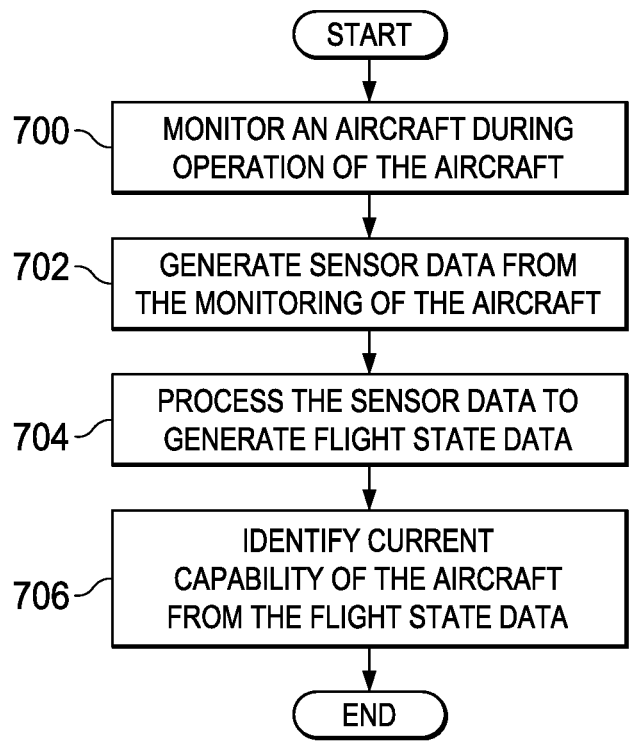
FIG. 7 is an illustration of a flowchart of process for performing performance monitoring of an aircraft in accordance with an illustrative embodiment.

The illustration of FIGS. 4-6 are not meant to limit the manner in which other illustrative embodiments may be implemented. For example, the examples in FIG. 6 and FIG. 7, are described with respect to climb rate. Other parameters in the current capability of an aircraft may be identified and displayed in a similar fashion. Rather, graphical user interfaces may use other forms to present the current capability of an aircraft to an operator. For example, the information may be displayed in a separate display rather than integrated as part of instruments or information normally displayed to the operator. In yet other illustrative examples, the information about the current capability of aircraft may be presented as audio or as tactile sensation in the control.

Although particular examples of graphical indicators are shown in FIG. 6 and FIG. 7, graphical indicators may take various forms other than those depicted. For example, a graphical indicator may be comprised of at least one of an icon, text, color, italics, bolding, animation, a line, and other suitable types of graphical elements that may be used to draw the attention of an operator, to provide information to an operator, or both draw the attention of the operator and provide information to the operator.

With reference now to FIG. 7, an illustration of a flowchart of process for performing performance monitoring of an aircraft is depicted in accordance with an illustrative embodiment. The different operations illustrated in FIG. 7 may be implemented in monitoring environment 100 in FIG. 1. In particular, these operations may be implemented using different components within aircraft 102.

The process begins by monitoring an aircraft during operation of the aircraft (operation 700). The monitoring in operation 700 is performed using sensor system 106 in FIG. 1 in the illustrative example. Sensor data is generated from the monitoring of the aircraft (operation 702). Thereafter, the sensor data is processed to generate flight state data (operation 704). In operation 704, parts of the sensor data may be selected for use as flight state data, sensor data may be processed to generate flight state data, or some combination thereof may be performed. For example, speed, altitude, climb rate, and other parameters in the sensor data may be used to identify parameters such as thrust, lift, and drag for the flight state data.

The current capability of the aircraft is identified from flight state data (operation 706). The process terminates thereafter. This current capability of the aircraft may be used to manage the aircraft during flight of the aircraft. The current capability may be used by a human operator, and autopilot, or some other suitable type of operator.

Figure 8:
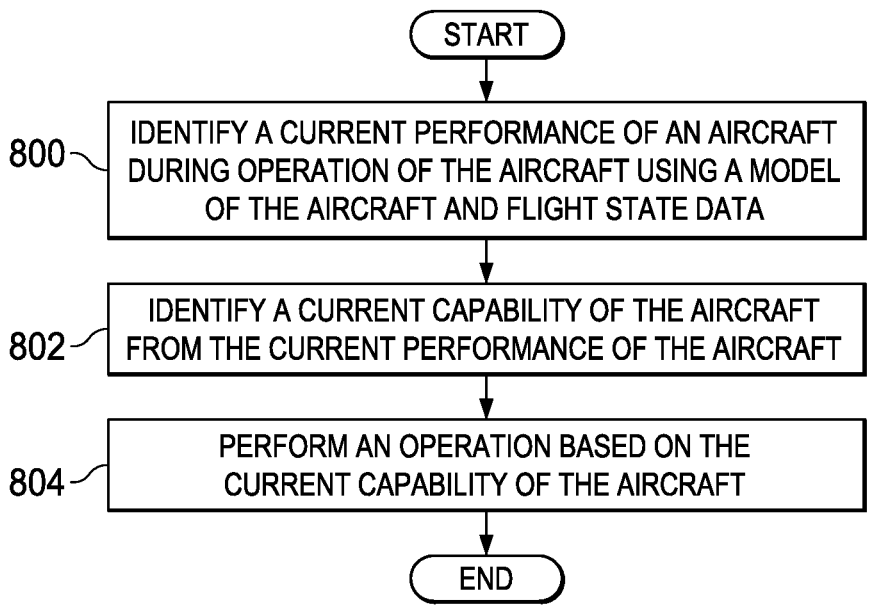
FIG. 8 is an illustration of a flowchart of a process for managing operation of an aircraft in accordance with an illustrative embodiment.

With reference now to FIG. 8, an illustration of a flowchart of a process for managing operation of an aircraft is depicted in accordance with an illustrative embodiment. The different operations in FIG. 8 may be implemented in monitoring environment 100 in FIG. 1.

The process begins by identifying a current performance of an aircraft during operation of the aircraft using a model of the aircraft and flight state data (operation 800). Thereafter, a current capability of the aircraft is identified from the current performance of the aircraft (operation 802). The process then performs an operation based on the current capability of the aircraft (operation 804). The process terminates thereafter.

The process illustrated in FIG. 8 may include one or more actions or steps. For example, the process may include generating a plan. The plan may include route planning, diversion planning, contingency planning, and other suitable types of plans. For example, the route of the aircraft may be changed to take into account the reduced capability of the aircraft to turn. In another example, the aircraft may be diverted to an alternative landing site. In yet another illustrative example, the route when climbing or maximum altitude of aircraft may be changed to take into account reduced capabilities of the aircraft. The plan may be presented to a pilot. The pilot may then take the appropriate actions based on the plan presented. If the aircraft is an unmanned aerial vehicle, the plan may be implemented automatically or a pilot controlling the aircraft on the ground may make take action on the plan.

Figure 9:
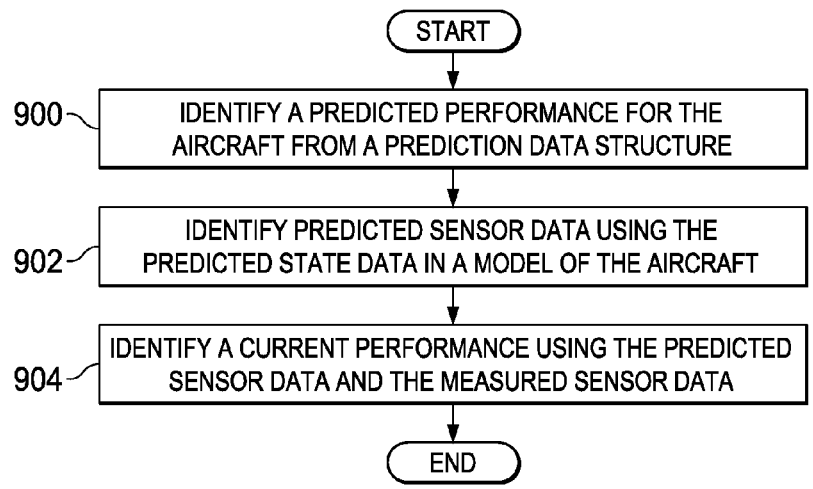
FIG. 9 is an illustration of a flowchart of a process for identifying a current performance of an aircraft in accordance with an illustrative embodiment.

With reference next to FIG. 9, an illustration of a flowchart of a process for identifying a current performance of an aircraft is depicted in accordance with an illustrative embodiment. The process illustrated FIG. 9 is an example of an implementation for operation 706 in FIG. 7 and operation 802 in FIG. 8.

The process begins by identifying a predicted performance for the aircraft from a prediction data structure (operation 900). The prediction data structure may be, for example, an aerodynamic and engine database or table.

The process then identifies predicted sensor data using the predicted state data in a model of the aircraft (operation 902). The process then identifies a current performance using the predicted sensor data and the measured sensor data (operation 904). The process terminates thereafter.

The current performance identified for the aircraft may be used to update the prediction data structure. In this manner, other components using the prediction data structure may have a more accurate prediction of the performance of aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, 706 in FIG. 7 and operation 802 in FIG. 8 may be implanted in other ways other than what the operations illustrated in FIG. 9. For example, operations may be implemented in which the current performance is identified directly with a model of aircraft. The current performance may be used directly rather than updating a prediction data structure such as an aerodynamic and engine database or table.

Figure 10:
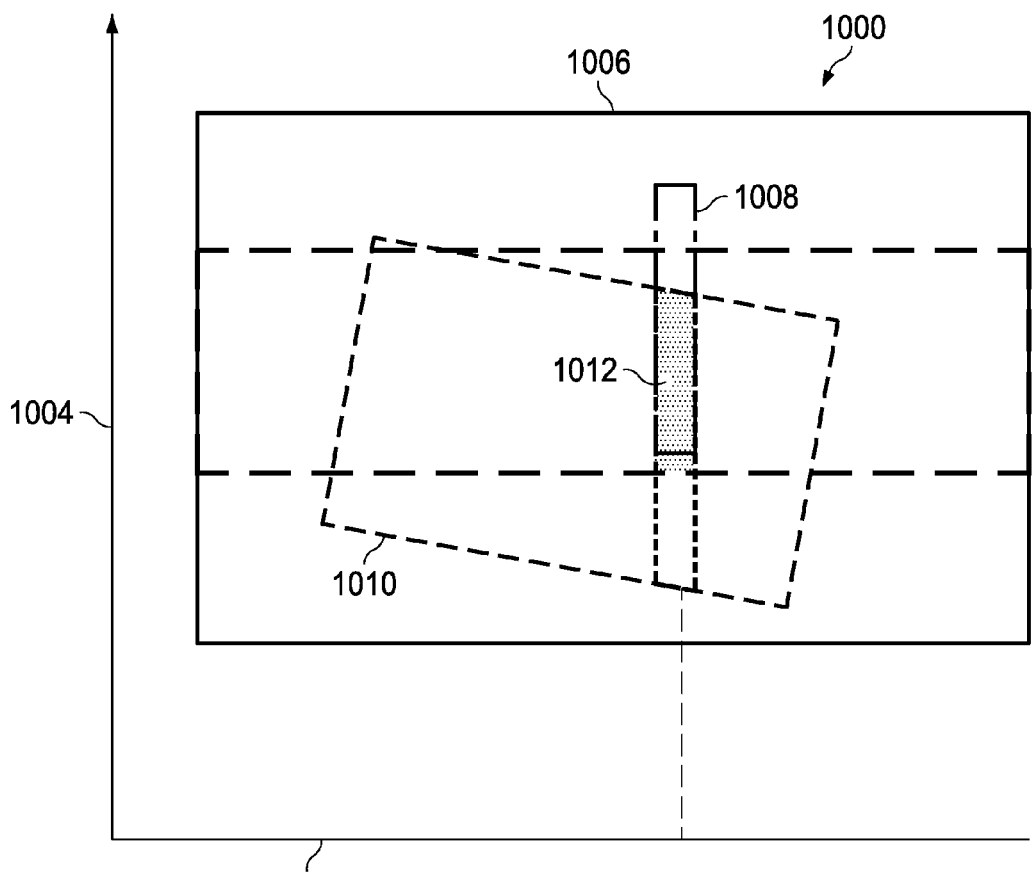
FIG. 10 is an illustration of a diagram for different envelopes of an aircraft in accordance with an illustrative embodiment.

Turning next to FIG. 10, an illustration of a diagram for different envelopes of an aircraft is depicted in accordance with an illustrative embodiment. In this illustrative example, graph 1000 illustrates capabilities for an aircraft. X-axis 1002 illustrates actual or hypothetical state data. Y-axis 1004 identifies a performance parameter.

In this illustrative example, rectangle 1006 is an envelope that illustrates the capability of the aircraft. This capability is the actual capability of the aircraft which may not be reached during normal operation of the aircraft. Rectangle 1006 defines an envelope that identifies the capability of the aircraft for a desired operating range. Rectangle 1006 may be defined based on cost, such as fuel consumption for the aircraft.

Rectangle 1008 may define an envelope for the capability of the aircraft with respect to passenger comfort. In other words, the aircraft may be operated within the area of 1008 to provide a desired level of passenger comfort. Rectangle 1010 defines an envelope that represents the current capability of aircraft. This current capability is different from the capability of aircraft defined by rectangle 1006. The current capability is a reduced portion of the capability of the aircraft occurring from inconsistencies, configuration changes, or other types of changes that may occur in the aircraft.

In this manner, the operation of the aircraft may be managed by an operator. For example, operation of the aircraft may be performed within section 1012. Section 1012 is defined by the intersection of rectangle 1008 and rectangle 1010. In this manner, the aircraft may be operated with the desired level of safety, cost, and passenger comfort. In other words, the envelope to find the current capability of the aircraft may be used with other envelopes defining other types of desired performance for the aircraft.

Turning now to FIG. 11, an illustration of a block diagram of a data processing system is depicted in accordance with an illustrative embodiment. Data processing system 1100 may be used to implement computer system 104 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communication framework may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information such as, for example, without limitation, data, program code in functional form, and/or other suitable information either on a temporary basis and/or a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code 1118.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in the form of a block diagram in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in the form of a block diagram in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12. One or more apparatus embodiments, method embodiments, or a combination thereof may be utilized while aircraft 1300 is in service 1212 and/or during maintenance and service 1214 in FIG. 12. The use of a number of the different illustrative embodiments may substantially expedite the assembly of and/or reduce the cost of aircraft 1300.

For example, an illustrative embodiment may be implemented during system integration 1208 during the manufacture of aircraft 1300. As another example, an illustrative embodiment may be implemented into aircraft 1300 during maintenance and service 1214. An aircraft performance monitoring system may be implemented as part of refurbishment, upgrade, reconfiguration, or other operations performed on aircraft 1300. In addition, an illustrative embodiment may be used during in service 1212 to aid in the operation of aircraft 1300.

In this manner, increased safety and reliability may be provided for an aircraft. The different illustrative examples may provide information used by pilots and other operators during operation of an aircraft. This information may be used to operate the aircraft with the desired level of safety. As described above, the different illustrative examples provide information about the current capability of an aircraft during operation of the aircraft.

In some illustrative examples, the operators may not be human operators. For example, one or more illustrative examples may be implemented using unmanned aerial vehicles. These unmanned air vehicles may be operated by computer systems to perform different missions. An illustrative embodiment may be implemented to provide the current capability of the aircraft to the computer system. In this manner, changes that may occur to the aircraft that affect the performance of the aircraft may be taken into account in operating the aircraft in a desired manner.

The description of the different illustrative embodiments has been presented for purposes of illustration and description, and is not intended to be exhaustive or limited to the embodiments in the form disclosed. Many modifications and variations will be apparent to those of ordinary skill in the art. For example, although the change in performance and capability has been described as being reduced, the performance and capability may be increased in some examples. For example, a change in configuration during flight may actually increase the performance or capability of the aircraft. For example, a change in wing configuration during flight may increase the climb rate of an aircraft.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for determining an ability of an aircraft to reach a performance goal during a flight, the method comprising:
  identifying, using a model of the aircraft and flight state data, a current performance of the aircraft during operation of the aircraft, such that the current performance comprises a current: lift, thrust, and drag, of the aircraft in flight;
  identifying a current flight envelope of the aircraft based upon a performance monitor comparing the current performance of the aircraft to a predicted performance for the aircraft based upon a baseline design for the aircraft, thus deriving delta performance factors and correcting an aerodynamic and engine database generating a next predicted aircraft performance input to the model;
  the performance monitor applying limits, based upon a desired state, onto the current flight envelope; and
  the aircraft performing an operation based on the current flight envelope of the aircraft.

2. The method of claim 1 further comprising:
  identifying the flight state data from sensor data generated by a sensor system for the aircraft, such that flight state data comprises effects due to a change in aircraft configuration, and the desired state comprises a state determined by at least one of: a range of the flight, an endurance of the flight, a safety factor of the flight, and a passenger comfort.

3. The method of claim 1, wherein performing the operation based on the current flight envelope of the aircraft comprises:
  displaying limits to a group of parameters for operating the aircraft.

4. The method of claim 1, wherein the flight state data is identified from sensor data from a sensor system for the aircraft, the sensor data comprising at least one of the flight state data comprising at least one of: a climb rate, a descent rate, a turn rate, an airspeed, a flight path angle, an altitude, and an attitude, of the aircraft such that the flight state data may be affected by at least one of: a weather factor, the aircraft performing a collision avoidance, an inconsistency in a cargo hold, an inconsistency in a skin panel of the aircraft, an undesired level of fluid in an aircraft system, a valve performing in an undesired manner in a system of the aircraft, an electromagnetic event, an unintended encounter for the aircraft with a bird, and hail.

5. The method of claim 1, wherein indicating the current flight envelope of the aircraft from the current performance of the aircraft comprises:
  indicating a change in the current flight envelope of the aircraft.

6. The method of claim 1, wherein performing the operation based on the current flight envelope of the aircraft from the current performance of the aircraft comprises at least one of displaying the current flight envelope for the aircraft, changing a route of the aircraft, or suggesting a change in the route of the aircraft.

7. The method of claim 1, wherein identifying the current flight envelope of the aircraft from the current performance of the aircraft comprises:
comparing the current performance of the aircraft from the model with the predicted performance of the aircraft from a prediction data structure;
identifying a difference between the current performance of the aircraft and the predicted performance of the aircraft; and
updating the prediction data structure based on the difference between the current performance of the aircraft and the predicted performance of the aircraft.

8. The method of claim 7, further comprising the prediction data structure being selected from one of: a table, a database, a linked list, a flat file, an aerodynamic and engine table, and the aerodynamic and engine database.

9. The method of claim 1, wherein identifying the current performance of the aircraft during the operation of the aircraft using the model of the aircraft and the flight state data is performed by the performance monitor; identifying the current flight envelope of the aircraft from the current performance of the aircraft is performed by a flight envelope monitor; and performing the operation based on the current flight envelope of the aircraft is performed by a flight envelope identifier.

10. The method of claim 9, wherein the performance monitor includes a Kalman filter.

11. An apparatus comprising an aircraft system configured to:
predict an ability of an aircraft to reach a performance goal during a flight, via a performance monitor configured to:
identify, using a model of the aircraft and flight state data, a current performance of the aircraft during operation of the aircraft, such that the current performance comprises a current: lift, thrust, and drag, of the aircraft in flight;
identify a current flight envelope of the aircraft based upon a comparison of the current performance of the aircraft to a predicted performance for the aircraft based upon a baseline design for the aircraft, thus deriving delta performance factors used to correct an aerodynamic and engine database that subsequently generates a predicted aircraft performance input to the model;
apply limits, based upon a desired state, onto the current flight envelope; and
indicate a capability for the aircraft to perform an operation based on the current flight envelope of the aircraft, such that, in operation, the aircraft system predicts the ability of the aircraft to reach the performance goal, via the performance monitor that:
identifies, using the model of the aircraft and flight state data, the current performance of the aircraft during operation of the aircraft, such that the current performance comprises the current: lift, thrust, and drag, of the aircraft;
identifies the current flight envelope of the aircraft based upon the comparison of the current performance of the aircraft to the predicted performance for the aircraft based upon the baseline design for the aircraft, thus deriving the delta performance factors used to correct the aerodynamic and engine database that subsequently generates the predicted aircraft performance input to the model;
applies limits, based upon the desired state, onto the current flight envelope; and
indicates the capability for the aircraft to perform the operation based on the current flight envelope of the aircraft.

12. The apparatus of claim 11, wherein an aircraft performance monitoring system is configured to identify the flight state data from sensor data generated by a sensor system for the aircraft, and the delta performance factors result from an inconsistency, not accounted for in the aerodynamic and engine database, in a component of the aircraft, such that, in operation, the aircraft performance monitoring system identifies the delta performance factors result from the inconsistency, not accounted for in the aerodynamic and engine database, in the component of the aircraft.

13. The apparatus of claim 11, wherein in being configured to perform the operation based on the current flight envelope of the aircraft, an aircraft performance monitoring system is configured to display limits to a group of parameters for operating the aircraft, such that, in operation, the aircraft performance monitoring system displays limits to the group of parameters for operating the aircraft.

14. The apparatus of claim 11, further comprising:
the sensor system being configured such that in operation the sensor system identifies the flight state data from sensor data for the aircraft, such that flight state data comprises effects due to a change in aircraft configuration; and
the performance monitor configured such that in operation the performance monitor applies limits, based upon more than one desired state, onto the current flight envelope, such that the desired state comprises a state determined by at least one of: a range of the flight, an endurance of the flight, a safety factor of the flight, and a passenger comfort.

15. The apparatus of claim 11, wherein in being configured to indicate the current flight envelope of the aircraft from the current performance of the aircraft, an aircraft performance monitoring system is configured to indicate a change in the current flight envelope of the aircraft.

16. The apparatus of claim 11, wherein performing the operation based on the current flight envelope of the aircraft from the current performance of the aircraft comprises at least one of displaying the current flight envelope for the aircraft, changing a route of the aircraft, or suggesting a change in the route of the aircraft.

17. The apparatus of claim 11, wherein in being configured to identify the current flight envelope of the aircraft from the current performance of the aircraft, an aircraft performance monitoring system is configured to compare the current performance of the aircraft from the model with a predicted performance of the aircraft from a prediction data structure; identify a difference between the current performance of the aircraft and the predicted performance of the aircraft; and update the prediction data structure based on the difference between the current performance of the aircraft and the predicted performance of the aircraft.

18. The apparatus of claim 16, wherein a prediction data structure is selected from one of a table, a database, a linked list, a flat file, an aerodynamic and engine table, and the aerodynamic and engine database.

19. An aircraft performance monitoring system comprising:
a performance monitor configured to:
predict an ability of an aircraft to reach a performance goal during a flight via: identifying, using a model of the aircraft and flight state data, a current performance of the aircraft during operation of the aircraft using the model of the aircraft and flight state data, such that the current performance comprises a current: lift, thrust, and drag, of the aircraft in flight; and apply limits, based upon a desired state, onto a current flight envelope, such that, in operation, the performance monitor applies limits, based upon desired states, onto the current flight envelope, the desired state comprising a state determined by at least one of: a range of the flight, an endurance of the flight, a safety factor of the flight, and a passenger comfort;

a flight envelope monitor configured to identify a flight envelope of the aircraft based upon the performance monitor comparing the current performance of the aircraft to a predicted performance for the aircraft based upon a baseline design for the aircraft, thus deriving delta performance factors and correcting an aerodynamic and engine database generating a next predicted aircraft performance input to the model; and a flight envelope identifier configured to identify a current performance capability of the aircraft from the flight envelope, based upon the desired states, such that aircraft control inputs are based upon the current performance capability.

20. The aircraft performance monitoring system of claim 19, wherein the operation is performed based on the current flight envelope of the aircraft identified by the flight envelope identifier, and the delta performance factors result from an inconsistency a component of the aircraft not accounted for in the aerodynamic and engine database.

* * * * *